April 17, 1951     A. RHODES     2,549,010
REPLACEABLE INSERT FOR VALVES

Filed April 24, 1946

*INVENTOR.*
ALBERT RHODES
*BY*
Oberlin & Limbach
ATTORNEYS

Patented Apr. 17, 1951

2,549,010

UNITED STATES PATENT OFFICE 2,549,010

REPLACEABLE INSERT FOR VALVES

Albert Rhodes, Cleveland, Ohio

Application April 24, 1946, Serial No. 664,618

2 Claims. (Cl. 251—167)

The present invention relates to improvements in a replaceable insert for valves which is universally usable for reconditioning a wide variety of sizes and types of valves, such as for example domestic water faucets. Although such valves as manufactured by the various manufacturers are enough different from one another to render many of the parts thereof non-interchangeable, they are the same insofar as the body of each is usually provided with a threaded bore terminating in an annular seat; and while the diameters and depths of such bores and the diameters of such seats may vary considerably, my insert is adapted to be effectively used in a majority of such valves. Very often in such valves the threads in the valve body become damaged or worn and the seat therein becomes scored beyond repair, whereupon the body must be replaced and in most cases the entire valve must be replaced either because replacement bodies are not available or are not handled by the local plumbing supply dealer. In either instance, the cost of reconditioning a valve is several times more than what it costs to do so with my insert.

It is, therefore, one principal object of this invention to provide an inexpensive replaceable insert for valves which provides a new valve stem and head, new threads engaged by said stem and two new valve seats, one for engagement with by the new valve head and the other for effectively sealing off the original seat in the valve body.

Another object of this invention is to provide a replaceable insert for valves in which both of the new seats therein may readily be replaced.

Another object is to provide a replaceable insert for valves in which there is an efficient metal-to-metal seal between the valve head and the new seat in the insert, such efficient seal having been provided without the necessity of manufacturing the parts to close tolerances and with smooth interengaging surfaces.

Another object is to provide a replaceable insert for valves in which one of the new seats is made of ductile material so as to be automatically polished or burnished when engaged by a rotating valve head which is made of a somewhat harder material.

Another object is to provide a replaceable insert for valves in which the ductile seat is supported against bending or buckling by means of a stiff supporting washer.

Another object is to provide a replaceable insert for valves in which the seat washer engaged by the valve head is resiliently supported and is self-alignable to a position coaxial of the valve head when engaged thereby, thus effecting a tight metal-to-metal seal without the necessity of applying excessive seating force on the valve head.

Additional objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
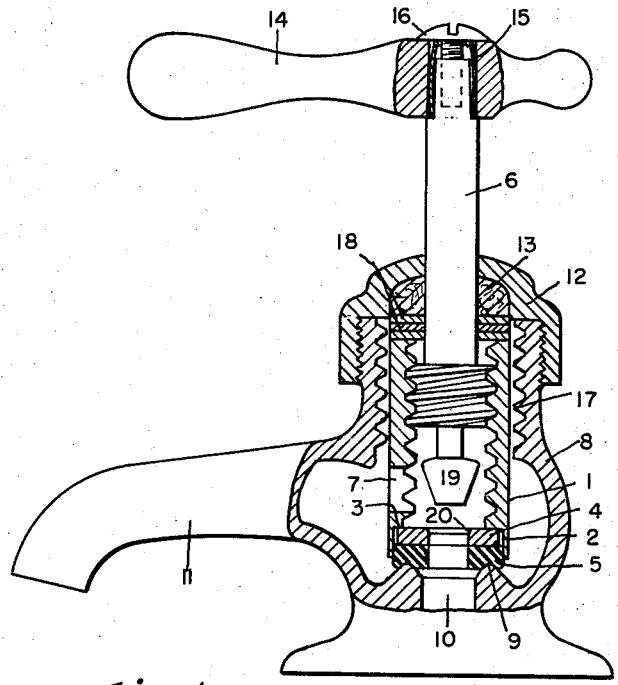
Fig. 1 is a longitudinal central cross section view of one form of insert showing such insert in assembled position in a typical valve.
Figure 2:
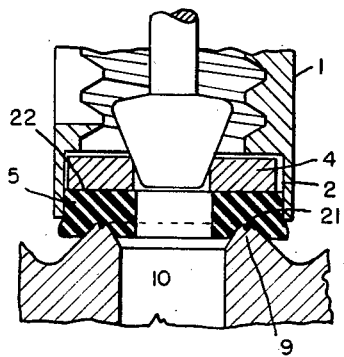
Fig. 2 is an enlarged fragmentary cross section view of the lower portion of the insert illustrated in Fig. 1.

Referring now to the drawing and first to Figs. 1 and 2, there is shown therein an insert comprising an internally threaded hollow sleeve 1 provided with a counter-bored end 2 defining with said thread a shoulder 3; a seat washer 4 and a resilient ring 5 in such counter-bored end of said sleeve; and a valve stem 6 in threaded engagement with said sleeve and rotatable into and out of engagement with said seat washer. Intermediate the ends of sleeve 1 is a side wall opening or openings 7 which affords communication between the ports of a valve in which the insert is mounted when the head of stem 6 is out of engagement with seat washer 4 as shown in Fig. 1.

The valve illustrated in Fig. 1 comprises a body 8 provided with an annular seat 9 which originally was engaged by a valve head to close communication between the inlet passage 10 and the discharge spigot 11. Such valve also originally included a bonnet 12 threaded onto body 8, a valve stem packing 13 and an operating handle 14, all of which, including the body, are usable with the insert constituting the present invention. The novel manner of rendering the stem 6 usable with handle 14 is the subject of my copending application Serial No. 644,964 and will not now be described in detail except to indicate that the leg portions of the spacer member 15 between stem 6 and the aperture in handle 14 are disposed to be bulged outwardly into engagement with the non-circular handle aperture upon pressure exerted thereon by the screw 16. Such bulging of the leg portions serves to non-rotatably secure the handle to the stem.

The above described valve is to be regarded as merely typical and may be of any general type, just so long as it is provided with a bore 17 terminating in a seat 9. As previously mentioned, while the diameter and depth of such bore 17 and the diameter of seat 9 may vary in different valves, the present insert can nevertheless be used in most of such valves because the diameter of sleeve 1 is made to fit into valve bodies having small bores 17 and the resilient ring 5 is of sufficient transverse width to accommodate most seats 9. Furthermore, the length of sleeve 1 is such that it will fit within bodies having shallow bores 17 and for valves having deeper bores, the effective length of sleeve 1 can readily be increased by inserting spacing washers 18 between the upper end of sleeve 1 and packing 13.

It will be apparent from Fig. 1 that screwing down of the bonnet 12 will, through packing 13, spacing washers 18, sleeve 1 and seat washer 4, urge the resilient ring 5 into engagement with seat 9 in the body and at the same time, the force so exerted on resilient ring 5 will effect deformation of packing 13 into sealing engagement with stem 6. Inasmuch as seat 9 may have score marks thereon or includes deep scratches or is otherwise irregular or rough, I prefer to make resilient ring 5 from rubber or rubber-like material so that when it is urged against said seat, it will be readily deformed to form a fluid tight seal therewith.

Seat washer 4 is preferably fitted rather loosely in counter-bore 2 of sleeve 1 so that when it is engaged by valve head 19, it can partake of slight tilting movement or transverse movement, or both, to align itself so that its seating surface 20 will be coaxial with the seating surface on valve head 19. In other words, resilient ring 5 serves as a resilient cushion or support for seat washer 4 so that the latter will resiliently engage valve head 19 and at the same time align itself therewith to form a fluid tight seal with application of but very slight turning force on the handle 14.

As shown in Fig. 2, when valve head 19 is in seating engagement with seat washer 4, the latter is displaced so as to be coaxial with head 19. At the same time such endwise seating force is effective to more firmly seat resilient ring 5 against seat 9 and the irregularities 21 therein and also to establish a firmer sealing contact at 22 between seat washer 4 and resilient ring 5. Such seating force on resilient ring 5 also tends to further bulge the same radially outward into firmer sealing contact with counter-bore 2.

Seat washer 4 is preferably made of relatively soft ductile material such as lead and stem 6 is preferably made of a somewhat harder material such as brass. In this way the rotation of valve head 19 relative to seat washer 4 during seating effects burnishing or polishing of the seat washer to render the surface 20 thereof perfectly smooth. Furthermore, particles of foreign matter which may become lodged on the surface 20 can be rubbed into or wiped into the relatively soft seat washer 4 without marring the surface of valve head 19. While I prefer to make the valve head 19 rotatable relative to seat washer 4 it may be desirable in certain cases, as for example where the two metals from which these parts are made have a tendency of seizing or scoring by such polishing action, to mount the valve head 19 so as to be rotatable relative to stem 6. In such case head 19 and seat washer 4 would engage one another without any such polishing action. However, as previously mentioned, I prefer to have such polishing action and to assure that seat washer 4 will not rotate, I have selected the materials of seat washer 4, resilient ring 5 and valve stem 6 so that the coefficient of friction between seat washer 4 and resilient ring 5 is greater than that between seat washer 4 and stem 6.

Figure 3:
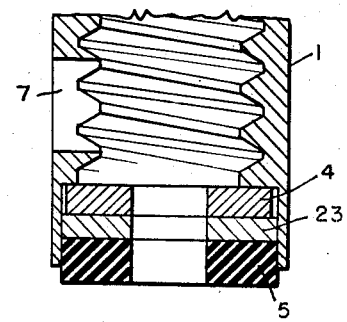
Fig. 3 is a fragmentary cross section view of the lower portion of a modified form of insert.

The modified form of insert illustrated in Fig. 3 is essentially the same as that illustrated in Figs. 1 and 2 except that a supporting washer 23 is interposed between seat washer 4 and resilient ring 5. This supporting washer 23, as the name implies, serves to support seat washer 4 against buckling or bending when the valve head 19 is seated thereagainst. Supporting washer 23 is preferably made of brass or steel or any other material which is stiffer than the material from which the seat washer 4 is made.

While I have shown a valve head 19 having a conical seating surface, it is to be understood that said head might be provided with a spherical or other shape of seating surface. That is to say that the burnishing action, the self-alignment of the seat washer and the other aforesaid features are not dependent upon the particular shape of the seating surfaces.

To summarize, it will be seen that I have provided a simple, inexpensive and efficient insert which, when assembled in a valve, completely reconditions the same insofar as the essential elements thereof are concerned. That is, there is provided a new stem, new threads and new seats. Thus, from what previously may have been considered a totally scrap valve, the body, bonnet and handle thereof have been salvaged without any sacrifice in the efficiency of the valve so rebuilt as compared with a new valve.

Other modes of applying the principle of the invention may be employed, change being made as regards the details described, provided the features stated in any of the following claims or the equivalent of such be employed.

I, therefore, particularly point out and distinctly claim as my invention:

1. A replaceable insert for valves comprising an internally threaded tubular sleeve counterbored at one end to provide a shoulder, an annular seat washer loosely fitted within such counterbored end of said sleeve and adapted to engage such shoulder, a valve stem in threaded engagement with said sleeve and provided with a conical valve head thereon reciprocable into engagement within said seat washer and out of engagement with said seat washer in response to rotation of said valve stem in opposite directions in said sleeve, and a resilient ring also in the counterbored end of said sleeve providing a resilient support for said seat washer, said ring having an exposed end surface adapted to be urged into engagement with a valve body by axial force exerted on said ring through said sleeve, shoulder, and seat washer, such resilient supporting of said seat washer by said resilient ring and such loose fit of said seat washer in said sleeve enabling transverse and tilting movements of said seat washer by said valve head to a position coaxial with said valve head upon engagement of said valve head within said seat washer.

2. A replaceable insert for valves comprising an internally threaded tubular sleeve counterbored at one end to provide a shoulder, an annular seat washer loosely fitted within such counterbored end of said sleeve and adapted to engage such shoulder, a valve stem in threaded engagement with said sleeve and provided with a conical valve head thereon reciprocable into engagement within said seat washer and out of engagement with said seat washer in response to rotation of said valve stem in opposite directions in said sleeve, a resilient ring also in the counterbored end of said sleeeve providing a resilient support for said seat washer, said ring having an exposed end surface adapted to be urged into engagement with a valve body by axial force exerted on said ring through said sleeve, shoulder, and seat washer, such resilient supporting of said seat washer by said resilient ring and such loose fit of said seat washer in said sleeve enabling transverse and tilting movements of said seat washer by said valve head to a position coaxial with said valve head upon engagement of said valve head within said seat washer, said seat washer being relatively thin and of material softer than said valve head, and a supporting washer of material harder than said seat washer interposed between said seat washer and resilient ring.

ALBERT RHODES.

REFERENCES CITED

The following references are of record in the file of this patent:

UNITED STATES PATENTS

| Number | Name | Date |
|---|---|---|
| 1,099,389 | Morrison | June 9, 1914 |
| 1,391,403 | Rapp | Sept. 20, 1921 |
| 1,431,701 | Sklaska | Oct. 10, 1922 |
| 1,667,580 | Albrecht | Apr. 24, 1928 |
| 1,934,486 | Carlson | Nov. 7, 1933 |
| 2,008,657 | Deiller | July 16, 1935 |
| 2,190,147 | Ciaccio | Feb. 13, 1940 |
| 2,277,388 | Clark | Mar. 24, 1942 |